US011634590B2

(12) United States Patent
Tuijtelaars et al.

(10) Patent No.: US 11,634,590 B2
(45) Date of Patent: Apr. 25, 2023

(54) REMOVABLE, BIODEGRADABLE COATING

(71) Applicant: Lumiforte Holding B.V., Baarle-Nassau (NL)

(72) Inventors: Bas Jacobus Catharina Tuijtelaars, Berkel-Enschot (NL); Albertus Ronald Hofkamp, Enkhuizen (NL); Cornelis Eme Koning, Zwolle (NL); Paulus Franciscus Anna Buijsen, Zwolle (NL); Roel Henri Martinus Weijers, Eindhoven (NL); Elizabeth Antoinette Maria Gerritse-van Hamersveld, Rijen (NL)

(73) Assignee: Lumiforte Holding B.V., Baarle-Nassau (NL)

( * ) Notice: Subject to any disclaimer, the term of this patent is extended or adjusted under 35 U.S.C. 154(b) by 733 days.

(21) Appl. No.: 16/494,505

(22) PCT Filed: Mar. 16, 2018

(86) PCT No.: PCT/NL2018/050169
§ 371 (c)(1),
(2) Date: Sep. 16, 2019

(87) PCT Pub. No.: WO2018/169404
PCT Pub. Date: Sep. 20, 2018

(65) Prior Publication Data
US 2020/0087519 A1 Mar. 19, 2020

(30) Foreign Application Priority Data

Mar. 17, 2017 (NL) ..................................... 2018543

(51) Int. Cl.
*C09D 5/00* (2006.01)
*A01G 9/14* (2006.01)
*C09D 7/61* (2018.01)
*C09D 167/02* (2006.01)
*C09D 167/06* (2006.01)
*C08G 63/91* (2006.01)

(52) U.S. Cl.
CPC ........... *C09D 5/008* (2013.01); *A01G 9/1438* (2013.01); *C09D 7/61* (2018.01); *C09D 167/02* (2013.01); *C09D 167/06* (2013.01)

(58) Field of Classification Search
None
See application file for complete search history.

(56) References Cited

U.S. PATENT DOCUMENTS

2002/0165108 A1* 11/2002 van Rossum ............ C09D 5/32
510/201

FOREIGN PATENT DOCUMENTS

| DE | 2251745 A1 | 5/1974 |
| WO | 9922588 A1 | 5/1999 |
| WO | 2013123314 A1 | 8/2013 |

\* cited by examiner

*Primary Examiner* — Ramsey Zacharia
(74) *Attorney, Agent, or Firm* — Banner & Witcoff, Ltd.

(57) ABSTRACT

The present invention relates to a functional coating obtained from an aqueous coating composition, which composition comprises a pigment and a polymeric binder, wherein the binder has a weight average molecular weight of from 2000 to 50000 g/mole, and an acid value of 40 to 250, and wherein the binder is a polyester comprising a side group introduced by a Diels-Alder and/or pericyclic Ene-reaction, wherein the side group contains an ionic group and/or an ion-forming group.

23 Claims, No Drawings

REMOVABLE, BIODEGRADABLE COATING

RELATED APPLICATION DATA

This application is a National Stage Application under 35 U.S.C. 371 of co-pending PCT application PCT/NL2018/050169 designating the United States and filed Mar. 16, 2018; which claims the benefit of NL application number 2018543 filed on Mar. 17, 2017 each of which are hereby incorporated by reference in their entireties.

The present invention relates to an aqueous coating composition for providing a functional coating which is removable with a removing agent comprising a strong base.

In horticulture, many plants are grown in greenhouses. Thus, they can benefit from optimized conditions, such as temperature, amount of light, humidity and the like. However, a problem with greenhouses is that the plants being grown in them are exposed, under warm, sunny weather conditions, to a large amount of radiation, which might disturb the living conditions and growth of the plants, and might even cause them to burn. To obviate this problem, it is customary in horticulture to protect the plants during the spring and the summer against the adverse effect of undue radiation by providing the transparent surfaces of the greenhouse with a functional coating.

One of the chief requirements to be met by such a functional coating is that sufficient protection from light and/or heat is achieved. To meet this requirement, the functional coating should contain a pigment, such as chalk or titanium oxide. The functional coating may also be used to scatter light, which can also be achieved using pigments. A further important requirement is that the functional agent from which the functional coating is formed exhibits sufficient adhesion to the surface of a greenhouse. When its adhesive strength is too low, the coating will not be sufficiently resistant to weather influences and it will be necessary to restore the coating several times per season or to replace it. When adhesion is too strong, it requires too much effort to remove the coating at the end of the season.

EP 0 999 736 describes aqueous coating compositions which are able to provide coatings on the transparent surfaces of greenhouses to protect plants during spring and summer against the adverse effect of undue radiation which may disturb the living conditions and growth of the plants and might even cause them to burn. The protective coating comprises a polymeric binder which has a weight-average molecular weight of 10,000-100,000 g/mole and an acid value of 40-250 mg KOH/g. Such a binder provides for sufficient adhesion of the coating to a surface, while the coating can be easily removed at any desired time. The protective coating is removable from the surface of the greenhouse by treating the coating with a removing agent comprising a strong base and a complex former. The removing agent renders the binder in the protective coating water-soluble or water-dispersible.

A disadvantage of EP 0 999 736 is that the binder used in the protective coating is not biodegradable. As those coatings are removed by applying an alkaline solution onto the coating and subsequently rinsing with water (e.g. with rain), all coating components, although not necessarily harmful, accumulate into the waste water. Accordingly, there is a need for functional coatings with a biodegradable binder, which binder is capable of degrading within the waste water to non-toxic components, and preferably still satisfies the requirements described in EP 0 999 736.

Although biodegradable polymers are known in the art, not every biodegradable polymer can be suitably used as the polymeric binder in functional coatings for horticulture. In addition to being biodegradable, the binder should have a good stability. Further, the binder should be capable of forming a coating composition with good stability that is easy to apply and (after drying) has a good adhesive strength and a good removability.

An object of the invention is to solve at least one of the above-mentioned problems.

In particular, it is an object of the present invention to provide a stable aqueous coating composition for providing a removable functional coating on a surface, which coating is removable with a removing agent comprising a strong base (in particular sodium and/or potassium hydroxide) and which composition contains a polymeric binder having an increased biodegradability.

As used herein, a stable aqueous coating composition does not phase separate when being stored at 21° C. and atmospheric pressure without agitating for at least 4 weeks, preferably 6 weeks and more preferably 10 weeks. Preferably, the aqueous coating composition of the present invention does not phase separate when being stored at 40° C. and atmospheric pressure without agitating for at least 4 weeks, preferably 6 weeks and more preferably 10 weeks. Phase separation in aqueous coating compositions may occur mainly as a result of excessive hydrolysis of the polymeric binder.

The object of the invention has surprisingly been achieved by providing an aqueous coating composition comprising a pigment and a polymeric binder, wherein the binder has a weight average molecular weight of from 2000 to 50000 g/mole, and an acid value of from 40 to 250 mg KOH/g polymeric binder, and wherein the binder is a polyester comprising a side group introduced by a Diels-Alder and/or pericyclic Ene-reaction, wherein the side group contains an ionic group.

The inventors found that the coating composition according to the invention can be suitably used as a functional coating on greenhouses. The polymeric binder used in the coating composition is biodegradable, is stable in water and provides for a stable coating composition (e.g. a stability of at least 6 weeks when being stored at 40° C. and atmospheric pressure without agitating). Furthermore, the coating composition can be easily applied to a surface of a greenhouse, forms a wear and weather resistance coating after drying and is easily removable from the surface when treating the coating with a removing agent comprising water, a strong base and preferably a complex former.

WO-A-2013123314 describes an aqueous coating composition for use in forming a food-contact coating, which composition contains a water dispersible binder polymer obtained by effecting a Diels-Alder reaction and/or pericyclic Ene-reaction between an unsaturated polyester and an unsaturated compound(s) containing ionic groups or ion-forming groups. This publication however does not disclose or teach to use the binder polymer in an aqueous coating composition for providing a functional coating which is removable with a removing agent comprising a strong base. Further, this publication is silent about the biodegradability of the polymeric binder.

WO-A-2013123314 in particular does not disclose a removable coating having a high acid value. WO-A-2013123314 is directed to providing a coating that can be used on packaging cans and containers for food and beverages. The cured coatings are described to provide high levels of resistance to corrosion or degradation that may be caused by prolonged exposure to products such as food or beverage products. As such, the coatings described in WO-A-

2013123314 are based on a crosslinked polymer and/or have a low acid value. Both crosslinking and a low acid value provide the coating with resistance to corrosion and degradation. Such coatings are not removable with a removing agent comprising a strong base. Accordingly, WO-A-2013123314 does not disclose removable coatings.

The binder present in the coating composition according to the invention may be obtained by at least the following steps:

(a) preparing an unsaturated polyester, (b) effecting a Diels-Alder reaction and/or pericyclic Ene-reaction between the unsaturated polyester and an unsaturated compound containing an ionic group and/or an ion-forming group to obtain a polymer with side groups containing an ionic group and/or an ion-forming group, and (c) optionally converting at least part of the ion-forming groups present in the polymer to ionic groups. Step (c) must be effected in case the polymer obtained in step (b) contains no ionic groups. Step (c) is preferably effected in case the polymer obtained in step (b) contains both ionic groups and ion-forming groups.

In particular, the binder may be obtained by at least the following steps:

(a) preparing an unsaturated polyester, (b) effecting a Diels-Alder reaction and/or pericyclic Ene-reaction between the unsaturated polyester and an unsaturated compound containing an ion-forming group to obtain a polymer with side groups containing an ion-forming group, and (c) converting at least part of the ion-forming groups present in the polymer to ionic groups.

Steps (a) to (c) are described in more detail below. In step (a), an unsaturated polyester is prepared. The unsaturated polyester may be prepared by methods known in the prior art. For example, the unsaturated polyester may be prepared by polycondensation, transesterification or reaction between an epoxide and an anhydride.

The unsaturated polyester is typically prepared from at least one unsaturated monomer and at least one, preferably at least two saturated monomers. The unsaturated monomer may for example be an unsaturated dicarboxylic acid, diol, anhydride or epoxide. The saturated monomer may be a saturated dicarboxylic acid, diol, anhydride or epoxide.

As the unsaturated monomer, an unsaturated dicarboxylic acid or anhydride can be used. The unsaturated dicarboxylic acid (anhydride) is preferably selected from the group consisting of maleic acid, maleic anhydride, fumaric acid, itaconic acid, itaconic anhydride, citraconic acid, citraconic anhydride and any mixture thereof. More preferably, the unsaturated dicarboxylic acid (anhydride) is selected from the group consisting of maleic acid, maleic anhydride, fumaric acid and any mixture thereof.

An unsaturated diol or epoxide can also be used as the unsaturated monomer. The unsaturated diol may for example be selected from 2-butene-1,4-diol, cis-3-hexenol and allyl alcohol. The unsaturated epoxide may for example be selected from limonene oxide and vinylcyclohexeneoxide. Preferably, at least one of the saturated monomers used to prepare the unsaturated polyester is a saturated diol. The diol is preferably selected from the group consisting of ethylene glycol, diethylene glycol, 1,2-propanediol, 1,3-propanediol, hexanediol, cyclohexanedimethanol, trimethylolpropane, pentaerytritol, glycerol, butane diol, neopentylglycol, and any mixture thereof.

Preferably, at least one of the saturated monomers used to prepare the unsaturated polyester is a dicarboxylic acid or anhydride. The saturated dicarboxylic acid or anhydride thereof is preferably selected from the group consisting of adipic acid, isophthalic acid, tetrahydrophthalic acid, terephthalic acid, hexahydrophthalic acid, decanedicarboxylic acid, dimer fatty acid, succinic acid, and anhydrides thereof, and any mixture thereof.

Optionally an aromatic dicarboxylic acid may be used as a saturated monomer, for example as a second saturated monomer in addition to the saturated monomers mentioned above.

Preferably, at least two different saturated monomers are used, i.e. a first saturated monomer and a second saturated monomer different from the first. The first saturated monomer is typically a saturated diol or epoxide (e.g. the saturated diol or epoxide specified above), while the second saturated monomer is typically a saturated dicarboxylic acid or anhydride (e.g. the saturated dicarboxylic acid or anhydride specified above).

Optionally monocarboxylic acids may be used as a saturated monomer, which may function as a chain stopper in the polymerization reaction. Non-limited example of monocarboxylic acid is benzoic acid, para-t-butyl benzoic acid, stearic acid and fatty acid.

The molar ratio between the amount of unsaturated monomers and the amount saturated monomers used to prepare the unsaturated polyester is in the range of 1:1 to 1:100, preferably in the range of 1:2 to 1:10, more preferably in the range of 1:3 to 1:6. Such a ratio results in a polymer with an acceptable amount of side groups. In order to satisfy the preferred ratio, at least two saturated monomers are typically used in order to limit the total amount of ionic and ion forming side groups that are produced by the Diels-Alder reaction and/or pericyclic Ene-reaction.

The polymerization reaction to prepare the unsaturated polyester is preferably conducted at a temperature of 180 to 220° C. Water present in the reaction mixture, such as reaction formed during the reaction, is preferably removed from the reaction mixture, e.g. by evaporation, typically by distillation. The reaction may be conducted in the presence of a polymerization catalyst. The polymerization may be conducted in a single or in multiple steps. The polymerization reaction may be conducted for at least one hour, preferably until a sufficiently low acid value is obtained, e.g. below 5 mg KOH/g.

The unsaturated polyester may for example be prepared from at least one unsaturated dicarboxylic acid or anhydride thereof, at least one saturated dicarboxylic acid, and at least one diol, preferably in the presence of esterification catalyst(s) and a free radical polymerisation inhibitor(s) at a temperature of from 180 to 220° C.

The reaction of step (a) results in an unsaturated polyester. The unsaturated polyester is preferably a linear or substantially linear unsaturated polyester. Substantially linear unsaturated polyesters means unsaturated polyesters in which substantially (i.e. at least 95 wt. %, preferably at least 98 wt. %, more preferably at least 99 wt. % and even more preferably at least 99.5 wt. %) of the monomers used to form the unsaturated polyester are mono-functional or di-functional monomers. Accordingly, substantially linear unsaturated polyesters include less than 5 wt. %, preferably less than 2 wt. %, more preferably less than 1 wt. % and even more preferably less than 0.5 wt. % of tri-functional or higher functional monomers (relative to the total amount of monomers used to form the unsaturated polyester). Since no further polymerization steps are conducted after step (a), the above features on linearity of the unsaturated polyester may also apply to the final (typically saturated) polyester obtained in steps (b) and (c). In this respect, the addition of the side groups may be considered as not adding additional branching, but rather as modification of the side groups of the monomers already present in the polymer backbone.

The unsaturated polyester preferably contains one or more double carbon-carbon bounds introduced in the backbone of the unsaturated polyester by the unsaturated diol, the unsaturated dicarboxylic acid, the unsaturated anhydride, the unsaturated epoxide or a mixture thereof, as e.g. described above for step (a).

In step (b), the unsaturated polyester obtained in step (a) is reacted with at least one unsaturated compound containing an ionic or ion-forming group. This reaction is a Diels-Alder reaction and/or pericyclic Ene-reaction. The reaction results in a polymer (viz. a polyester) comprising a side group introduced by the Diels-Alder and/or pericyclic Ene-reaction, The unsaturated compound with an ionic group and/or an ion-forming group contains one or more double bonds. The unsaturated compound with an ionic group and/or ion-forming group preferably contains one or more carbon-carbon double bonds, more preferably one or more conjugated carbon-carbon double bonds and even more preferably one conjugated carbon-carbon double bond.

The unsaturated compound containing an ionic group and/or ion-forming group preferably comprises a conjugated diene with a carboxylic acid ionic group and/or a carboxylate forming group. More preferably, the unsaturated compound is a conjugated diene with carboxylic acid ionic groups and/or carboxylate forming groups.

Non-limiting examples of unsaturated compounds with an ionic group or an ion-forming group include sorbic acid, muconic acid, 2,4-pentadienoic acid, furoic acid, vinyl acetic acid, (meth)acrylic acid, the carboxylates of any of these acids, 1-amino-1,3-butadiene and the protonated amine of 1-amino-1,3-butadiene. The unsaturated compound with ionic groups and/or ion-forming groups preferably comprises sorbic acid and/or the carboxylate of sorbic acid (sorbate). More preferably, the unsaturated compound is selected from the group consisting of sorbic acid, sorbate and any mixture thereof.

The reaction of step (b) may be conducted at a temperature in the range of 120 to 190° C., preferably 140 to 170° C. The molar ratio between the amount of unsaturated compound and amount of unsaturated monomer used to prepare the unsaturated polyester is in the range of 1:2 to 2:1, preferably in the range of about 1:1. The reaction may be conducted in the presence of a catalyst. The reaction may be conducted for at least one hour.

In step (c), at least part of the ion-forming groups of the side chain of the polymer obtained in step (b) are converted to ionic groups. This may be done by reacting the polymer with a neutralizing agent. The neutralizing agent is typically a volatile base, preferably a volatile amine, such as ammonia. After the reaction of step (c), the neutralizing agent will be converted to its ionic, typically cationic form. The cationic form of the neutralizing agent may be a protonated version of the neutralizing agent, e.g. $NH_4^+$ in case ammonia was used as the neutralizing agent. The ionic form of the neutralizing agent may act as a counter ion to the ionic groups of the polymeric binder.

The ion-forming groups may be converted to an ionic group selected from the group consisting of carboxylate (—COO$^-$), sulphate (—OSO$_3^-$), phosphate (—OPO$_3^-$), sulphonate (—SO$_2$O$^-$), phosphinate (—POO$^-$), phosphonate (—PO$_2$O$^-$). This is typically done by reaction with a base, which deprotonates the ion-forming group. The ion-forming group typically corresponds to the protonated version of the ionic group. For example, a carboxylic acid group may be converted to a carboxylate.

Preferred neutralizing agents to be used in step (c) include amines, in particular volatile inorganic and organic amines selected from the group consisting of tertiary amines, ammonia, and mixtures thereof. Non-limiting examples of suitable tertiary amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Ammonia is the most preferred neutralizing agent.

The reaction of step (c) is conducted by adding the reaction product obtained in step (b) to an aqueous solution comprising the neutralizing agent. The aqueous solution preferably has a temperature of 20-100° C., more preferably 70-80° C. The product of step (b) may have a temperature of 120-190° C., typically 150-160° C. The amount of neutralizing agent used should be sufficient such that the polymeric binder will be soluble or dispersible in water. Accordingly, the amount of neutralizing agent will depend on the acid value of the polymeric binder, with the amount being larger for a polymeric binder with a lower acid value. The molar ratio between the amount of acid groups and the amount of neutralizing agent is in the range of 1000:1 to 10:13, preferably in the range of about 10:8 to 10:11. After neutralization, the reaction mixture may be cooled and additional aqueous solution of the neutralizing agent may be added to obtain a desirable pH and additional water may be added to obtain a desirable viscosity.

The polymeric binder used in the coating composition of the invention, e.g. as obtained in steps (a)-(c) described above, has the following properties.

The polymeric binder is a polyester comprising a side group introduced by a Diels-Alder and/or pericyclic Ene reaction, wherein the side group contains an ionic group.

The polymeric binder may comprise two or more different monomer residues. These correspond to the unsaturated and the saturated monomers that are typically used in the polymerization reaction to obtain the unsaturated polyester, as described above for step a). The preferred monomer residues of the polymeric binder can be derived from the reaction compounds used for reaction steps (a), (b) and (c), which compounds are described in detail above. The percentage of the number of monomeric residues in the polymeric binder that comprises a side group with an anionic group may be 5-50%, preferably 10-30%, based on the total number of monomeric residues in the polymeric binder.

The ionic groups of the polymeric binder are typically anionic groups, e.g. carboxylate groups. Preferably, the anionic groups are selected from the group consisting of carboxylate groups (—COO$^-$), sulphate groups (—OSO$_3^-$), phosphate groups (—OPO$_3^-$), sulphonate groups (—SO$_2$O$^-$), phosphinate groups (—POO$^-$), phosphonate groups (—PO$_2$O$^-$) and any combination thereof. The polymeric binder preferably comprises carboxylate (—COO$^-$) groups. The polymeric binder may also comprise a cationic group, e.g. a protonated amine group.

Due the presence of the ionic groups in the side group, the polymeric binder will typically have a net charge. The polymeric binder can be considered a polysalt or a polyelectrolye, i.e. a polymer with at least one monomeric residue that bears a charged group. In addition to the charged groups, the polymeric binder may further comprise counter ions. These counter ions balance the charge provided by the ionic groups of the polymeric binder. The counter ion is preferably a protonated volatile amine, more preferably ammonium. Examples of suitable volatile amines are described above with respect to the neutralizing agent.

The polymeric binder present in the coating composition of the invention comprises ionic groups in such an amount that the polymeric binder is water-dispersible or water-soluble at 40° C. and atmospheric pressure. Preferably, the polymeric binder present in the coating composition of the invention comprises ionic groups in such an amount that the polymeric binder is water-dispersible or water-soluble at 21° C. and atmospheric pressure. The polymeric binder typically comprises side groups containing ionic groups in an amount of at least 1 wt. %, preferably at least 3 wt. %, more preferably at least 5 wt. %, based on the weight of the polymeric binder. The polymeric binder typically comprises side groups containing ionic groups in an amount of at most 50 wt. %, typically less than 25 wt. %, based on the total weight of the polymeric binder.

The polymeric binder has a weight average molecular weight of from 2000 to 50000 g/mole. The weight-average molecular weight of the binder may influence the biodegradability and stability of the binder. Taking these parameters into account, the following preferred ranges can be defined for the weight-average molecular weight of the binder. Preferably, the polymeric binder has a weight average molecular weight of at least 3000 g/mole, more preferably at least 4000 g/mole and most preferably at least 5000 g/mole. Preferably, the polymeric binder has a weight average molecular weight of at most 40000 g/mole, more preferably at most 30000 g/mole and most preferably at most 20000 g/mole. Most preferably, the polymeric binder has a weight average molecular weight of from 5000 to 20000 g/mole. Furthermore, a low weight-average molecular weight is normally indicative of short polymer chains, which may entail a poorer binding effect in the coating to be used. Moreover, the degradation of the binder under the influence of (UV) radiation has more effect when short chains are broken than when long chains are broken. Too high a weight-average molecular weight also entails disadvantages. Often, the viscosity of the coating composition will be too high when the chains of the binder are too long. The agent is then difficult to apply to a surface. As used herein, the weight average molecular weight may be determined as described in the experimental part of the description.

The polymeric binder preferably has a number average molecular weight of from 1000 to 10000 g/mole. Preferably, the polymeric binder has a number average molecular weight of at least 2000 g/mole. Preferably, the polymeric binder has a number average molecular weight of at most 8000 g/mole, more preferably at most 6000 g/mole and most preferably at most 5000 g/mole. Most preferably, the polymeric binder has a number average molecular weight of from 2000 to 5000 g/mole. As used herein, the number average molecular weight may be determined as described in the experimental part of the description.

The polymeric binder preferably has a polydispersity of a value of 1 to 20, preferably of 2 to 15. The term 'polydispersity' used herein means the ratio between the weight-average and the number-average molecular weight ($M_w/M_n$).

The polymeric binder has an acid value of from 40 to 250 mg KOH/g polymeric binder. Preferably, the polymeric binder has an acid value from 40 to 160 mg KOH/g polymeric binder. More preferably, the polymeric binder has an acid value from 60 to 130 mg. Such acid values are advantageous with respect to the removability of the coating from the surface. As used herein, the acid value is determined as described in the experimental part of the description. In order to achieve a coating with good removability, the acid value of the polymeric binder should be selected sufficiently high. The acid value of a polymeric binder will be higher when a higher number of ionic groups (in particular a higher number of anionic groups, such as carboxylate groups) is present in the polymeric binder. Accordingly, in case the skilled person would want to improve the removability of a coating, he can increase the relative amount of monomers having an ionic group when preparing the polymeric binder. In particular, when conducting the Diels-Alder and/or pericyclic Ene reaction, he can increase the relative amount of the unsaturated compound containing an ionic group and/or ion-forming group used in order to achieve this.

The polymeric binder preferably has a glass transition temperature from 10 to 80° C. More preferably, the glass transition temperature of the polymeric binder is from 20 to 70° C. A coating with a binder with such glass transition temperature may exhibit good adhesion to the surface of a greenhouse. A polymeric binder having such glass transition temperature also yields a coating composition that has good handling properties and is easy to apply to form the functional coating. As used herein, the glass transition temperature is determined as described in the experimental part of the description.

The polymeric binder comprises one or more side groups. The side group may for example be attached to a carbon atom of a monomeric residue selected from a dicarboxylic acid residue, a diol residue, an anhydride residue and an epoxide residue. The side group may be attached to a carbon atom of the backbone of the polyester.

The side group of the polymeric binder may be represented by any one of structures (1)-(4):

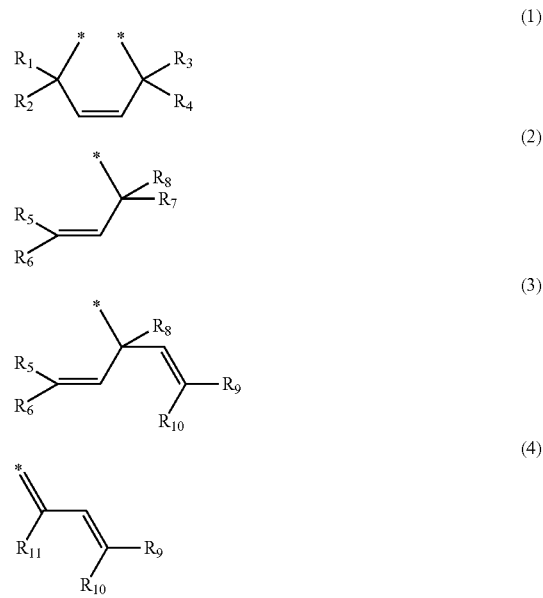

or any isomer thereof, wherein $R_1$ to $R_{11}$ are defined as follows: —$R_1$ is selected from the group of anionic groups, which group consists of carboxylate (—COO$^-$), sulphate (—OSO$_3^-$), phosphate (—OPO$_3^-$), sulphonate (—SO$_2$O$^-$), phosphinate (—POO⁻), phosphonate (—PO₂O⁻) and substituted alkyl, alkenyl, aryl and alkylaryl groups of the formula —R$_{12}$-A⁻, wherein R$_{12}$ is linear or branched alkyl, alkenyl, aryl or alkylaryl moiety, which moiety preferably has 1-12 carbon atoms, even more preferably 1-6 carbon atoms, e.g. a —C$_x$H$_{2x}$— group with x is 1, 2, 3 or 4. Thus, the —R$_{12}$-A⁻ is effectively a linear or branched alkyl, alkenyl, aryl or alkylaryl group to which the ionic (A⁻) group is substituted.

The asterisk (*) in formulas (1)-(4) indicate the position at which the side group is attached to the polyester. The side group is typically attached to a carbon atom of the polyester, e.g. a carbon atom of the backbone of the polyester, via a covalent bond. In case of structure (1), the side group is attached to the polyester at two different positions, typically at two adjacent carbon atoms, e.g. two covalently bound carbon atoms that may be part of the backbone of the polyester.

wherein A⁻ is an anioic group selected from carboxylate, sulphate, phosphate, sulphonate, phosphinate and phosphonate, preferably a carboxylate;

—R$_2$-R$_{11}$ may each be individually chosen from either the group of anionic groups defined for R$_1$ or from the group consisting of hydrogen, alkyl, alkenyl, aryl and alkylaryl, preferably from the group of H, alkyl and alkenyl.

The —R$_{12}$-A⁻ may for example be a methyl, ethyl, propyl, butyl, ethenyl, 1-propenyl, 2-propenyl, 1-butenyl, 2-butenyl, phenyl or tolyl group substituted with an A⁻ group, preferably with a —COO⁻ group.

In case R$_2$-R$_{11}$ is an alkyl group or alkenyl group, the group may be linear or branched. The group may have 1-12 carbon atoms, preferably 1-6 carbon atoms, for example methyl, ethyl, propyl, butyl, ethenyl, 1-propenyl, 2-propenyl, 1-butenyl or 2-butenyl. In case R$_2$-R$_{12}$ is an aryl or alkylaryl group, it preferably is or comprises a phenyl ring, which may be substituted with an alkyl or alkylene group, e.g. methyl. The aryl or alkylaryl group may have 1-12 carbon atoms. Alternatively, though less preferred, the aryl or alkylaryl group is a naphtalene moiety or an anthracene moiety, optionally substituted with an alkyl or alkylene group, e.g. methyl.

For structure (1), R$_2$ and/or R$_4$ are preferably H. R$_1$ preferably is or comprises a carboxylate group (i.e. is —COO⁻ or —R$_{12}$COO⁻), for example a linear —C$_x$H$_{2x}$COO⁻ group with x=1-5. R$_3$ is as defined above for R$_2$-R$_{12}$ in general and preferably is methyl, ethyl or propyl.

In one embodiment of structure (1), each of R$_1$, R$_2$, R$_3$ and R$_4$ are part of a naphtalene or anthracene moiety substituted with an anionic group, preferably a carboxylate or —R$_{12}$COO⁻ group.

For structure (2), at least one of R$_5$, R$_6$, R$_7$ and R$_8$ must be an anionic group. R$_5$ and R$_8$ are preferably hydrogen, while R$_6$ and R$_7$ are both individually selected from the general group defined for R$_2$-R$_{11}$ above.

For structure (3), at least one of R$_5$, R$_6$, R$_8$ R$_9$ and R$_{10}$ must be an anionic group. R$_5$, R$_8$ and R$_{10}$ are preferably hydrogen, while R$_6$ and R$_{11}$ are both individually selected from the general group defined for R$_2$-R$_{11}$ above. For structure (4), at least one of R$_9$ R$_{10}$ and R$_{11}$ must be an anionic group. R$_{10}$ is preferably hydrogen, while R$_{10}$ and R$_{11}$ are both individually selected from the general group defined for R$_2$-R$_{11}$ above.

The side group may also be an isomer of any of structures (1)-(4), in particular an isomer obtained as a result of repositioning of one or more of the double bonds in the structure. The side group of the polymeric binder, for example those depicted in structures (1)-(4), may comprise a conjugated system. Therefore, one or more isomers of the side group may exist.

In a preferred embodiment, the polymeric binder comprises a unit according to formula (5) or (6):

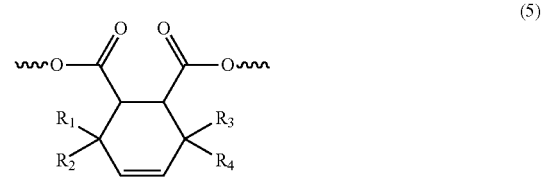

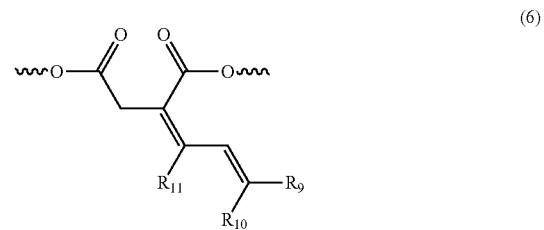

or any isomer thereof. Herein, R$_1$, R$_2$, R$_3$, R$_4$, R$_9$, R$_{10}$ and R$_{11}$ are as defined above. The molecular structure depicted in formula (5) or (6) may result from introducing an unsaturated compound in an unsaturated polyester containing unsaturated dicarboxylic acid units based on fumaric acid, maleic acid or maleic anhydride. Such a configuration may be in particular stable due to the formation of a conjugate system comprising the ene groups and the ester group.

In a particular preferred embodiment, the polymeric binder comprises at least one of the structural units according to formula (5) and (6), and/or any isomer thereof, wherein R$_1$ and R$_9$ are COO⁻B⁺, R$_2$, R$_4$ and R$_{10}$ are H, R$_3$ is ethyl and R$_{11}$ is ethyl. Herein, the COO⁻B⁺ group represents an ionic group obtained by neutralizing a COOH group with neutralizing agent B. Such units can for example be obtained when sorbic acid is used as unsaturated compound in step (b) and fumaric acid, maleic acid and/or maleic anhydride were used as monomers in step (a).

The coating composition according to the invention comprises the polymeric binder described above, a pigment and a number of optional ingredients. The components and composition are described in detail below.

The amount of the polymeric binder present in the coating composition of the present invention may be from 4 to 95, preferably from 5 to 60 wt. %, more preferably from 10 to 45, based on the dry weight of the coating composition. For example, the amount of polymeric binder may be from 15 to 90 wt. %.

The amount of pigment present in the coating composition of the present invention is preferably from 5 to 95 wt. %, more preferably from 10 to 85 wt. %, based on the dry weight of the coating composition. For example, the amount of pigment may be from 40 to 95 wt. %. The amount may depend on the type of pigment used. In case of calcium carbonate or titanium dioxide, In case the pigment is selected from the group of calcium carbonate, titanium dioxide and silicate, gypsum, baryte, and combinations thereof, the pigment is generally present in the coating composition in an amount of preferably 20-95 wt. %, more preferably 40-85 wt. %, based on the dry weight of the coating composition. In case the pigment is selected from the group consisting of mica, mica based pigments and boehmite, the amount of the pigment in the coating composition is preferably 5-75 wt. %, more preferably 10-50 wt. %, based on the dry weight of the coating composition.

The term "dry weight" of the coating composition, as used herein, refers to the total weight of the aqueous coating composition minus the weight of the water present in the aqueous coating composition.

The pigment may be selected from the group of calcium carbonate, titanium dioxide, boehmite (such as nano boehmite), mica (such as synthetic mica), mica based pigments, a silicate, such as magnesium or aluminum silicate, gypsum, baryte, and combinations thereof. As pigment, any substance can be used that can be suitably dispersed in the aqueous coating composition from which the coating according to the invention is formed, and which imparts the coating with desired properties. For example, certain pigments can provide protective action against (solar) radiation. Such pigments preferably yield a white protective coating. Suitable pigments may be selected from the group of calcium carbonate, titanium dioxide, a silicate, such as magnesium or aluminum silicate, gypsum, baryte, and combinations thereof. Pigments are also known that can scatter light when present in the coating, resulting in diffuse light inside the greenhouse. This may be desirable for plants that need lots of light. An example of such a pigment is nano boehmite. Yet other pigments are known that can reflect certain types of light, such as mica (e.g. synthetic mica) and mica based pigments. Depending on the desired properties of the functional coating, the skilled person will be able to suitably select the pigment. Generally, a pigment is typically used that selectively absorbs, reflects, transmits and/or scatters certain types of light, in particular light of a particular wavelength.

The weight ratio of polymeric binder to pigment may be in the range of 20:1 to 1:15, preferably in the range of 15:1 to 1:5. Typically, the weight ratio of polymeric binder to pigment may be 2:1 or smaller, generally 1:1 or smaller. The specific ratio may depend on the type of pigment used. Titanium oxide has a very high covering power, so that only a relatively small quantity thereof is needed. As a consequence, the ratio between binder and pigment will be relatively larger for this pigment. When much binder with respect to the pigment can be used, the weather resistance of the coating will be better. The advantage of the use of calcium carbonate is that a coating based thereon becomes slightly transparent in damp weather, so that the light intensity within a greenhouse adjusts itself to the weather conditions. Further, calcium carbonate is an economically attractive natural product and upon removal gives little, if any, visual or other contamination of the environment.

To optimize the viscosity of the aqueous coating composition according to the invention, a thickener can be included. Suitable thickeners may be xantham gum, acrylic thickeners, cellulose derived thickeners such as carboxymethylcellulose and hydroxyethylcellulose, and sodium starch glycolate. The optimum viscosity of the coating composition depends on the method by which the coating is applied to a surface. If a surface is brushed with the coating composition, a higher viscosity will be desirable than when a surface is sprayed with a coating composition. Further, the viscosity must be sufficient to obtain a thick coating. On the basis of his common professional knowledge, the skilled person will be able to determine which viscosity is most suitable in any given case. Examples of thickeners comprise organic and inorganic thickeners, such as hydroxyethyl cellulose, magnesium aluminum silicate and combinations thereof. A preferred thickener is xanthan gum The amount of the thickener will be tuned to the desired viscosity and may be between 0.1 and 5 wt. %, preferably between 0.5 and 3 wt. %, based on the dry weight of the coating composition.

The coating composition may further comprise a weak base in addition to the neutralizing agent possibly present in the polymeric binder. A weak base can provide for neutralization of free acid groups present in one or more components of the coating composition. It has also been found that the presence of the weak base leads to improved film formation of the coating composition upon drying, when a functional coating is being formed. Preferably, the weak base is selected from the group of ammonia, mono-, di- and trialkylamines, with the alkyl group containing from 1 to 8 carbon atoms. Particularly preferred is ammonia ($NH_3$), which can be suitably dissolved in the aqueous coating composition The weak base is preferably present in an amount of 0.2-5 wt. %, more preferably of 0.4-3 wt. %, based on the dry weight of the coating composition.

The coating composition may have a pH in the range of 8.0-12.0, preferably 9.0-11.0, even more preferably 9.5-10.5. The desirable pH can be achieved by adding the above-mentioned weak base.

Preferably, the coating composition further comprises an adhesion promoter. The adhesion of the coating to a surface will be improved by the presence of an adhesion promoter, while the ease of removing the functional coating is hardly, if at all, affected. The presence of such a substance may also prevent aggregation of pigment upon drying of the aqueous coating composition. Depending on the material of the surface on which a functional coating is to be provided, the skilled person will be able to select a suitable adhesion promoter. Preferably, the adhesion promoter is water-soluble and contains an amino group. The roof or walls of a greenhouse to which the coating composition is to be applied are typically made of glass, but can also be made of transparent plastic. Accordingly, the adhesion promoter preferably promotes adhesion of the coating to a glass or plastic surface. The adhesion promoter is preferably a glass adhesion promoter, i.e. a compound promoting the adhesion of the coating to a glass surface. For use on glass surfaces, it is recommended to use a silane, such as γ-aminopropyltriethoxysilane, γ-aminopropyltrimethoxy silane, γ-(methylamino)propyltrimethoxy silane, γ-aminopropylmethyldiethoxy silane, γ-(2-aminoethyl-3-aminopropyl)triethoxy silane and γ-(2-aminoethyl-3-aminopropyl)methyldimethoxy silane. The adhesion promoter may also be a plastic adhesion promoter, i.e. a compound promoting the adhesion of the coating to a plastic surface. An adhesion promoter will typically be present in the functional coating in an amount of 0.05 to 1% by weight, preferably from 0.1 to 0.3% by weight, based on the dry weight of the coating composition.

Another constituent that may advantageously be present in the coating composition is a pigment divider. The presence of such a substance prevents aggregation of pigment upon drying of the coating composition when forming the functional coating. A pigment divider can be present in amounts of from 0.1 to 0.5 wt. %, based on the dry weight of the coating composition. The nature of the pigment divider depends on the nature of the pigment present in the coating composition. Thus, sodium hexametaphosphate is highly suitable when calcium carbonate is used as pigment. When titanium dioxide is used as pigment, for instance a polymeric multifunctional surfactant, such as Ser-Ad FA 607® (available from the firm of Elementis) can be used excellently as a pigment divider.

The coating composition may further comprise a defoamer, which may be present in an amount of 0.1-2 wt. %, based on the dry weight of the coating composition.

Preferably, the composition does not comprise any significant amount of crosslinker. A crosslinker is a molecule capable of forming a covalent linkage between two or more polymer molecules (in this case, between two or more polymeric binder molecules). In addition, the term crosslinker may also include a molecule capable of forming a covalent linkage between two different regions of the same polymer molecule (i.e. within one polymeric binder molecule). A crosslinker can be a separate molecule or a moiety or monomeric unit in the polymer. The presence of a crosslinker is undesirable as it will decrease the removability of the coating. Accordingly, the coating composition preferably comprises less than 1 wt. %, more preferably less than 0.5 wt. %, even more preferably less than 0.1 wt. %, most preferably no crosslinker, based on the total dry weight of the coating composition.

The coating composition further comprises water. The coating composition may comprise 25-95 wt. % water, preferably 40-80 wt. % water, typically about 45-70 wt. % water, based on the total weight of the coating composition. A composition with such an amount of water is in particular suitable for distribution. However, before such a coating composition can be suitably used to form a functional coating on a surface, the coating composition is typically diluted with water by a factor 1.5-15, preferably a factor 2-12. If the coating composition comprises calcium carbonate as pigment, the coating composition may be diluted with water 1.5-5 times. If titanium oxide is used as pigment, that dilution is a factor of 5-12 times.

The present invention further relates to the use of the coating composition as described herein to obtain a functional coating on an outside wall and/or roof of a greenhouse and which coating is removable with a removing agent comprising a strong base.

The present invention further relates to a method for forming a functional coating on a surface, e.g. on an outside wall and/or roof of a greenhouse, wherein the method comprises (1) applying the coating composition as described herein to the surface and (2) drying the coating composition. Preferably, the coating is formed without crosslinking the binder.

The coating composition according to the invention can be suitably applied to surfaces of different materials. Preferably, the surface is a substantially transparent surface, such as an outside surface of a greenhouse, for instance a horticultural greenhouse. Typically, the surface will be made of glass or plastic. Conventionally used plastics are, for instance, polycarbonates, polyolefins, polyethylene terephtalate and polyesters.

The application of the coating composition can occur in different ways. Possible ways include spraying, brushing and the like. The functional action of the coating will be hardly, if at all, affected by the manner of application.

The inventors found that the coating composition can be easily applied, forming a smooth layer and drying quickly.

After drying of the coating composition, a functional coating will have been formed. The binder in the coating is no longer soluble in water after drying. Typically, the neutralizing agent will evaporate during drying. As a result, the ionic groups of the binder will be converted to their neutral states and the polymeric binder will no longer be a salt, such that it is no longer soluble in water.

Accordingly, the invention further relates to a functional coating. The functional coating has good resistance to wear under different weather types. When applied to a greenhouse or other surface, the functional coating can perform its function for several weeks or even months. The binder in the functional coating is typically not crosslinked.

The term "functional coating" as used herein refers to a coating that comprises a pigment that selectively absorbs, reflects, transmits and/or scatters certain types of light, in particular light of a certain wavelength. The function of the coating is mainly determined by the type of pigment used. The functional coating may be a protective coating, which provides protection against light and/or heat. For example, the coating may be used to reflect infrared light. The functional coating may also be used to scatter light and/or to make the light that passes through the coating diffuse. Such a coating may be referred to as an light enhancing coating. Examples of pigments that provide the protective or light enhancing function are mentioned above for the coating composition.

It will be clear that the functional coating according to the invention will have a similar composition as the coating composition, except that water and the neutralizing agent (e.g. in case of a volatile base) will no longer be present. These will have been evaporated during the drying step.

When in the course of time, for instance at the end of the season, the functional coating is to be removed, the coating according to the invention is treated with a removing agent, comprising a strong base and preferably a complex former, which renders the binder in the functional coating water-soluble.

Accordingly, the present invention further relates to a method for removing a functional coating as described herein from a surface, e.g. from an outside wall and/or roof of a greenhouse, wherein the method comprises treating the functional coating with a removing agent comprising water, a strong base and preferably a complex former.

The strong base is preferably present in an amount of from 1 to 10 wt. %, preferably 2 to 5 wt. %, based on the weight of the removing agent. Suitable strong bases are, for instance, alkali metal hydroxides such as sodium hydroxide, potassium hydroxide and lithium hydroxide. Preferably, sodium hydroxide or potassium hydroxide is used.

Preferably, a complex former is present in the removing agent. A complex former improves the ability of the removing agent to remove the functional coating. The complex former is preferably present in an amount of from 2 to 10 wt. %, based on the weight of the removing agent. For example, tetrasodium N,N-bis(carboxylatomethyl)-L-glutatmate or the trisodium salt of alanine, N,N-bis(carboxylmethyl) can be used as a complex former. These substances are properly and rapidly biodegradable.

Especially when a functional coating provided on a plastic is to be removed, it is found to be of great advantage to use a removing agent that further comprises an organic solvent. It is also possible to use an organic solvent separately, in addition to the removing agent. The latter option is advantageous in that the organic solvent used does not necessarily need to be alkali-resistant. A great many solvents are eligible for use as a separate component. Examples include benzyl alcohol, tetrahydrofuran, 1,4-dioxane, dimethyl sulfoxide, higher alcohols, such as butanol, pentanol, hexanol, cyclohexanol and isomers thereof, and cyclohexanone. The organic solvent effects a still easier removal of the functional coating.

It is preferred to use the organic solvent in the removing agent. This is beneficial in particular to the simplicity of the procedure of removing the functional coating. In that case, an alkali resistant organic solvent should be used. The amount of organic solvent is preferably 10-30% by weight, more preferably 15-25% by weight, based on the weight of the removing agent. Particularly preferred is the use of benzyl alcohol. Benzyl alcohol is little volatile, little toxic to man and animals and hardly combustible, so that the health of those working with the removing agent is not put at risk. When benzyl alcohol ends up in the environment after the removal of the functional coating, this does not yield unacceptable contamination.

In addition to the constituents mentioned, the removing agent may further contain a thickener, such as xanthan gum. Xanthan gum renders the removing agent highly pseudoplastic, so that it is thin when being applied and thick after being applied. This property prevents the agent from flowing off the surface too fast. Further, the removing agent may contain a substance reducing the surface tension, or an emulsifier. For instance, the sodium salt of dodecylbenzenesulfonic acid is suitable.

An example of a suitable removing agent is ReduClean (available from Mardenkro, the Netherlands)

To remove the functional coating, the coating is treated with the above-described removing agent. This treatment comprises applying the removing agent onto the coating to be removed, for example by spraying or pouring, Typically, the removing agent is used in a 5 to 10-fold dilution. After application of the removing agent, the surface can be rinsed with water. It is also possible to allow the rain to wash things off. Thereafter, virtually all traces of the functional coating will be gone.

The present invention is now illustrated by reference to the following examples. Unless otherwise specified, all parts, percentages and ratios are on a weight basis.

EXAMPLES

Test Methods

Stability of Aqueous Solutions

Samples were put in 30 ml jars and sealed air-tight. All samples were clear, indicating good solubility in water. They were placed in an oven at 40° C. Biweekly the samples were checked for clarity. When the samples became hazy this indicated that the solubility in water is limited. From that moment, the sample is called unstable.

Biodegradability

Biodegradability is measured analogue to OECD 301 F: Manometric Respirometry. Instrument used was Aqualytic BOD-System AL606. Reference material is sodium acetate. Activated sludge was supplied by Tauw B.V. in Deventer, the Netherlands. The use of this activated sludge resulted in a degradation of the reference material, sodium acetate, of 17% after 14 days and 24% after 28 days. Calculated values are relative to the sodium acetate.

Weight Average Molecular Weight $M_w$ and Number Average Molecular Weight $M_n$

The weight average molecular weight can be measured using size exclusion chromatography (SEC). The SEC analyses in these experiments were performed on an Advance Polymer Chromatography system (Waters APC), including a pump, auto injector, degasser, and column oven. The eluent was tetrahydrofuran (THF) to which 0.8 vol % acetic acid was added, based on the total volume of THF. The injection volume was 10 µl. The flow was established at 1.0 ml/min. Three Acquity APC columns of 15 cm with different pore sizes: 450 Å, 125 Å and 45 Å were applied in series at a temperature of 40° C. The detection was performed with a differential refractive index detector (Waters Acquity Refractive Index detector). The sample solutions were prepared with a concentration of 50 mg solids in 5 ml eluent (THF+0.8 vol % acetic acid, based on the total volume of THF), and the samples were dissolved for a period of 24 hours. Calibration is performed with 21 polystyrene standards (Agilent EasiCal), ranging from 162 to 3,000,000 g/mole. The calculation was performed with Empower 3 software (Waters) with a fourth order calibration curve. The obtained molar masses are polystyrene equivalent molar masses (g/mole).

Acid Value

The acid value may be calculated using a method based on ISO 2114. Sample (approximately 1.5 g, weighed to nearest 0.01 g) is dissolved in tetrahydrofurane (50 ml) and water (2 ml). The solution is titrated with 0.1 N potassium hydroxide in ethanol using o-cresolphthalein as indicator. Pink colour should persist for 10 seconds. Acid value (AV) is calculated by: AV=(ml KOH solution*0.1*56.11)/sample weight in grams. The acid value is expressed by mg KOH/g polymeric binder.

Glass Transition Temperature $T_g$

The Tg was measured by DSC using the Mettler Tolledo 821 using ME-26763 alumina cups of 40 µl. The flow rate was 50 ml/min of nitrogen and the sample was loaded at a temperature range of 20-25° C. The sample was first heated to 150° C. using a rate of 20° C./min. At 150° C. the sample was cooled to 0° C. at a rate of −10° C./min. At 0° C. the sample was heated to 80° C. at a rate of 5° C./min. The reported Tg is the measured inflection point.

Solids Content

Solids content is measured on a Mettler Toledo HR73 Halogen Moisture Analyser. Sample (0.9-1.1 grams) is spread out in a spiral shape on the fluffy side of a Φ90 mm Macherey-Nagel MN85/90 filter paper held in a Φ100 mm Schuett-biotec aluminium weighing/IR sample dish. Drying temperature is 160° C. and automatic switch-off criterion set to 4 (medium-slow drying). The instrument shows the solids content in weight %.

Example 1: Preparation of Polymeric Binders 1-7

In this example, polymeric binders 1-7 were prepared as described below.

Polymeric Binder 1—Polymerization (Step a)

Neopentylglycol (39.7 g), adipic acid (13.8 g), isophthalic acid (3.2 g), fumaric acid (22.4 g), benzoic acid (13.3 g), butyl stannoic acid (400 ppm) and hydroquinone monomethylether (300 ppm) were heated in a reactor with a flow of nitrogen gas to a temperature of 210° C. Water was removed using a vigreux column maintaining a maximum top temperature of 100° C. Once the top temperature of the column dropped below 80° C. the column was removed and the product was kept at atmospheric pressure for 1 hour. Using vacuum distillation, the reaction was continued until an acid number of <5 mg KOH/g was obtained. Then the mixture was cooled to 150° C.

Polymeric Binder 1—Introducing Side Group (Step b)

At 150° C. sorbic acid (21.6 g) was added under stirring and reacted for 2 hours, keeping the temperature at 150° C.-160° C., to yield a solid polymer after cooling.

Polymeric Binders 2-9—Polymerization and Introducing Side Group

Polymeric binders 2-9 were prepared in the same manner as polymeric binder 1, but with different compositions which are shown in Table 1. For binders 8 and 9, the saturated diol 1,2 propane diol was replaced using neopentyl glycol instead. For these binders, also lithium hydroxide monohydate was present as a result of the 1,2 propane diol synthesis, wherein LiOH was used to decrease etherification of the secondary hydroxy group. The test results are also reported in Table 1.

TABLE 1

|  | 1 | 2 | 3 | 4 | 5 | 6 | 7 | 8 | 9 |
|---|---|---|---|---|---|---|---|---|---|
| Neopentyl-glycol (g) | 39.7 | 40.8 | 41.2 | 41.5 | 43.3 | 43.9 | 42.5 | — | — |
| 1,2-Propane-diol (g) | — | — | — | — | — | — | — | 36.5 | 35.8 |
| Adipic acid (g) | 13.8 | 13.8 | 13.8 | 13.8 | 13.8 | 21.9 | | 20.3 | 15.0 |
| Isophthalic acid (g) | 3.2 | 9.7 | 12.4 | 14.2 | 26.8 | 12.9 | 35.6 | 16.6 | 21.1 |
| Fumaric acid (g) | 22.3 | 22.3 | 22.3 | 22.3 | 14.5 | 18.5 | 18.5 | 22.3 | 22.2 |
| Benzoic acid (g) | 13.3 | 6.1 | 3.0 | 1.0 | 2.8 | — | — | — | 1.5 |
| Butyl stannoic acid (ppm) | 400 | 400 | 400 | 400 | 400 | 400 | 400 | 800 | 800 |
| Hydro-quinone monomethyl ether (ppm) | 300 | 300 | 300 | 300 | 300 | 300 | 300 | 450 | 450 |
| LiOH monohydrate (ppm) | — | — | — | — | — | — | — | 130 | 130 |
| Sorbic acid (g) | 21.6 | 21.6 | 21.6 | 21.6 | 14.0 | 17.7 | 17.9 | 21.5 | 21.5 |
| Measured Mn | 1383 | 2166 | 2711 | 3794 | 3109 | 3650 | 4151 | 2303 | 2817 |
| Measured Mw | 3372 | 7327 | 10480 | 36028 | 10905 | 28026 | 38655 | 9106 | 10739 |
| Measured Acid Value (mg KOH/g) | 110 | 109 | 111 | 108 | 73 | 87 | 89 | 106 | 112 |
| Tg (° C.) | 15 | — | 29 | 41 | 29 | 18 | 66 | 31 | 38 |

Polymeric Binder 1—side group conversion (step c)

Polymeric binder 1 (30 g) was discharged in a mixing vessel containing water (66.7 g), preheated to 80° C., containing a 25% ammonia solution (3.3 g) to be able to neutralise approximately 80% of the acid groups of the polymer, and mixed until completely dissolved. After cooling additional ammonia was dosed to the final product, till a pH of 9.0 was reached and additional water was added to obtain a viscosity below 500 mPa·s. The final polymeric binder solution had a solid content of 30% and was stable for at least 6 weeks at 40° C.

Polymeric Binders 2-9—Side Group Conversion (Step c)

In the same manner as polymeric binder 1, polymeric binders 2-9 were discharged in water and an ammonia solution to yield polymeric binder solutions 2-9 with solid content and pH as indicated in Table 2. The stability at 40° C. (see above) of binder solutions 1-6 was monitored for over 10 weeks. No phase separation was observed during this time. Such stability data have not (yet) been conducted for binder solutions 7, 8, and 9.

Biodegradability was determined using the test described above. The biodegradability percentages were determined after 28 days of biodegradation.

Example 2: Preparation of Polymeric Binder 10 (Comparative Example)

Neopentylglycol (43.1 g), adipic acid (25.0 g), isophthalic acid (33.3 g) and butyl stannoic acid (400 ppm) were heated in a stirred reactor with a flow of nitrogen gas to a temperature of 240° C. Water was removed using a vigreux column maintaining a maximum top temperature of 100° C. Once the top temperature of the column dropped below 80° C. the column was removed and, using vacuum distillation, the reaction was continued until an acid number of <5 mg KOH/g was obtained. Then the mixture was cooled to 180° C. At 180° C. trimellitic anhydride (12.8 g) was added and reacted for 1 hour, keeping the temperature at 180° C. The reaction product had an acid value of 74.9 mg KOH/g and was diluted with acetone to obtain a solids content of 64.9%.

The obtained reaction product (65.3 g) and 25% ammonia solution (2.6 g, to neutralise 68% of the acid value) were heated to a temperature of 40° C. in a stirred reactor. Water (420 g) was added in 8 minutes. Acetone and part of water was removed from the resulting emulsion by vacuum distillation at a temperature of 30-40° C. to obtain a solids content of 45.2%.

This emulsion was stable for less than 2 weeks at 40° C.

TABLE 2

| | Binder Solution | | | | | | | | |
|---|---|---|---|---|---|---|---|---|---|
| | 1 | 2 | 3 | 4 | 5 | 6 | 7 | 8 | 9 |
| | Polymeric binder | | | | | | | | |
| | 1 | 2 | 3 | 4 | 5 | 6 | 7 | 8 | 9 |
| Solid Content (%) | 30 | 31 | 29 | 31 | 27 | 31 | 25 | 34.1 | 35.6 |
| pH | 9.0 | 9.0 | 9.1 | 9.1 | 9.1 | 9.0 | 9.0 | 9.1 | 9.1 |
| Stability (wks at 40° C.) | >10 | >10 | >10 | >10 | >10 | >10 | — | — | — |
| Biodegradability after 28 days (%) | 83 | 48 | 46 | 23 | 27 | 41 | — | 51* | — |

*This value was measured in a separate biodegradability test using a different activated sludge than the sludge used for binders 1-8 - this test was conducted according to OECD 301 F: Manometric Respirometry.

Example 3: Preparation of the Coating Composition

Aqueous coating composition with the following composition were prepared:
23.4 wt. % of polymeric binder solution;
49 wt. % $CaCO_3$ pigment
less than 1 wt. % additives such as ammonia, an adhesion promoter, antifoam and dispersant.

The coating compositions were prepared for each of polymeric binder solutions 1-9 described above by mixing each binder solution with a $CaCO_3$ pigment slurry and the additives.

Example 4: Preparation and Removability of the Coating

A coating was prepared from the coating composition. First, the coating composition was diluted using 5 weight parts of water on 1 weight part of the aqueous coating composition. The diluted coating composition was applied to the surface of a glass plate and was subsequently allowed to dry. The coated glass plates were subjected for 24 hours to UV radiation in a UV chamber. Subsequently, the coated glass plates were subjected for 7 days to UV radiation in a climate chamber. While in the climate chamber, the coated glass plates were further subjected every 8 hours to 15 minutes of artificial rain (simulated using a water sprinkler).

The wear resistance of the coating was determined by measuring the transmission of the coating using a spectrograph, both before and after subjecting the coatings to UV and climate chambers. An increase in transmission is an indication of wear.

The removability of the coating was determined by applying the removing agent ReduClean diluted with 7 volume parts water (1:7) (ReduClean comprises a strong base and a complex former) to a strip of 5 cm of coating of the coated glass. After drying, the plate was analyzed for any remaining coating residue.

The results of the wear resistance and removability test are shown in Table 3. All coatings showed acceptable removability and wear resistance. Coating composition V and VII showed the best wear resistance, although composition V scored a little lower than the rest on removability.

Coating composition A comprised the following ingredients:
about 50 wt. % pigment ($CaCO_3$);
about 7 wt. % of polymeric binder 3; and
less than 1 wt. % other additives, such as ammonia, an adhesion promoter, antifoam and dispersant. The weight amounts are based on the total weight of coating composition A.

As the binder in coating composition A, a polyester prepared according to the method given above for polymeric binder 3 was used. The polymeric binder had a Mw of 10480 and an acid value of 111.

The coating composition B comprised about 50 wt. % of an acrylic binder, the same amount and type of pigment used in coating composition A and less than 1 wt. % of other additives, such as ammonia, an adhesion promoter, antifoam and dispersant.

The coating compositions were diluted with water by a factor of about 10. The resulting composition were applied to the roof surface of a greenhouse.

Both coating compositions had desirable properties, such that it could be applied evenly on the surface of the greenhouse. The coating composition dried quickly, thereby forming a functional coating.

After six weeks, the coatings were analyzed for any wear. There were no big differences observed for the two coatings. Although some wear of the coatings had taken place, both coatings were still in good condition.

To test the removability of the coating, a removing agent based on sodium hydroxide (ReduClean, available from Mardenkro) was used by spraying the outside surface of the greenhouse. After 15 minutes, the surface was sprayed with water, which removed the coatings.

Based on this Examples, it can be concluded that a coating composition comprising a biodegradable polymeric binder according to the present invention works just as well as the commercially available coating composition comprising an acrylic binder. Both coating compositions could be easily and evenly applied, were resistant to wear and were removable by a strong base.

TABLE 3

|  | Coating Composition | | | | | | | | |
| --- | --- | --- | --- | --- | --- | --- | --- | --- | --- |
|  | I | II | III | IV | V | VI | VII | VIII | IX |
| Polymeric Binder | 1 | 2 | 3 | 4 | 5 | 6 | 7 | 8 | 9 |
| Removability | + | + | + | + | + | + − | + | + | + |
| Wear Resistance | + − | + | + | + | + + | + + | + + | + − | + − |

Example 5: Application of Coating Composition on Greenhouse

An experiment was conducted wherein a coating composition according to the present invention comprising a biodegradable binder (coating composition A) was compared to a coating composition comprising a non-biodegradable binder, as described in EP 0 999 736 and available from Mardenkro under the name ReduSol (coating composition B).

Comparative Example 6: Removability Binders WO2013/123314

In order to compare the removability of the coating composition according to the present invention and the removability of the coating compositions described in WO 2013/123314, the polymer of Example 1 of WO2013/123314 (binder 11) and a similar polymer with higher acid value (binder 12) were reproduced and used to coat a glass surface.

Reworking WO 2013/123314:

Binder 11 was prepared according to the experimental method described in Example 1 of WO2013/123314. Only example 1 was reproduced.

Preparation Binder 11 (Example 1, WO2013/123314):

Binder 11 was prepared according to the experimental method described in Example 1 of WO2013/123314.

Binder 11 was synthesised according the recipe and experimental method as described for example 1 in WO2013/123314 but at a scale of 3214 grams solid polymer yield in a 5 ltr. glass reactor. A vigreux-type glass column was used instead of the packed column. The stirrer speeds were adapted to suppress foaming. For safety reasons, the reactor was not sampled during the time the column was in place and the column was removed before the addition of Maleic anhydride instead of afterwards, both to prevent sudden pressure build-up caused by reaction water floating back into the reactor. The viscosity was determined to be similar as in Example 1 of WO2013/123314. As the right acid value—viscosity balance was reached in stage 3 (before the addition of sorbic acid), it can be concluded that the deviations from the procedures in WO2013/123314 did not result in deviations in polymer properties. As diethylene glycol mono methyl ether was not available, 2-butoxyethanol (butylglycol) was used instead.

The amounts of reactant used to prepare binder 11 are listed in Table 4 below. The resulting polymer solution had a solids content of 65.5%. The acid value of the polymeric binder was measured to be 21.1.

Preparation Binder 12 (WO2013/123314 with Higher Acid Value)

Binder 12 was prepared using the same experimental method as for binder 11, except that a higher relative amount of sorbic acid was used in order to obtain a binder with a higher acid value. The amount used of the other monomers used was adjusted as well in order to obtain the appropriate molar equivalent ratios.

The amounts of reactant used to prepare binder 12 are listed in Table 4 below. The resulting polymer solution had a solids content of 66.0%. The acid value of the polymeric binder was measured to be 37.0.

TABLE 4

|  | binder 11 | binder 12 |
|---|---|---|
| 1,4 cyclohexane dimethanol (g) | 218.8 | 226.8 |
| 2-methyl-1,3-propane diol (g) | 916.5 | 950.0 |
| trimethylol propane (g) | 14.8 | 15.3 |
| isophthalic acid (g) | 408.7 | 423.7 |
| terephthalic acid (g) | 1218.0 | 897.7 |
| butyl stannoic acid (g) | 3.2 | 3.2 |
| decane dioic acid (g) | 268.3 | 278.1 |
| ethane diol (g) | 145.8 | 151.2 |
| maleic anhydride (g) | 256.6 | 481.5 |
| xylene (g) | 192.0 | 192.0 |
| sorbic acid (g) | 120.6 | 226.4 |
| Solids content of solution (wt. %) | 65.5 | 66.0 |
| Measured Acid Value (mg KOH/g) | 21.1 | 37.0 |

Removability Test:

The removability with a strong base was evaluated for a coating based on binders 11 and 12. The removability test was the same as described in Example 4 above.

A coating was prepared from binder solutions 11 and 12 as follows. First, each binder solution was diluted using 4 weight parts of acetone on 1 weight part of the binder dispersion. Acetone was used instead of water (used in Example 4) in order to obtain a solution that could suitably be applied to a glass surface (which could not be achieved for binders 11 and 12 when diluting the binder with water). The resulting diluted coating composition was applied to the surface of a glass plate and was subsequently allowed to dry. Two coated glass plates were prepared for both binder solution 11 and 12.

The coated glass plates were subjected for 24 hours to UV radiation in a UV chamber. Subsequently, the coated glass plates were subjected for 7 days to UV radiation in a climate chamber. While in the climate chamber, the coated glass plates were further subjected every 8 hours to 15 minutes of artificial rain (simulated using a water sprinkler).

The removability of the coating was determined by applying the removing agent ReduClean diluted with 7 volume parts water (ReduClean comprises a strong base and a complex former and is available from Mardenkro B.V.) to ⅓ part of the glass plate. After about 1 hour, the removing agent was removed by spraying the glass plates with water and subsequently dried.

It was clear from visual inspection that no coating was removed by the removing agent. Furthermore, the coated glass plates were weighed before and after the treatment with the removing agent. The results are shown in Table 4.

TABLE 5

| glass plate | binder | Weight before treatment with removing agent | Weight after treatment with removing agent |
|---|---|---|---|
| #1 | 11 | 292.25 | 292.28 |
| #2 | 11 | 298.03 | 298.03 |
| #3 | 12 | 297.70 | 297.72 |
| #4 | 12 | 292.70 | 292.70 |

CONCLUSION

It can be concluded that the coating compositions based on binders 11 and 12 are not removable using a strong base. It is expected that the removability of the coating will become even worse when the polymeric binder would have been crosslinked.

Example 2 of WO 2013/123314 A1 describes the preparation of an aqueous dispersion of Example 1 in combination with an epoxy functional acrylic resin which is capable of crosslinking with the carboxylic acid groups of the polymer of Example 1. In Example 4, another crosslinker is added before application of the composition to the surface.

In view of the addition of crosslinkers, it can be expected that coatings based on the crosslinked binders prepared in Examples 2 and 4 of WO 2013/123314 A1 will have an even worse removability than the coatings based on binders 11 and 12.

The invention claimed is:

1. An aqueous coating composition for providing a removable functional coating, which coating is removable with a removing agent comprising a strong base wherein the strong base is an alkali metal hydroxide, the coating composition comprises a pigment and a polymeric binder, wherein the binder has a weight average molecular weight of from 2000 to 50000 g/mole, and an acid value of 40 to 250 mg KOH/g polymeric binder, wherein the binder is a polyester comprising a side group introduced by a Diels-Alder and/or pericyclic Ene-reaction, wherein the side group contains an ionic group.

2. The coating composition according to claim 1, wherein the binder is obtained by at least the following steps:
   (a) preparing an unsaturated polyester,
   (b) effecting a Diels-Alder reaction and/or pericyclic Ene-reaction between the unsaturated polyester and an unsaturated compound containing an ionic group and/or ion-forming group to obtain a polymer with side groups containing ionic groups and/or ion-forming groups, and
   (c) optionally converting at least part of the ion-forming groups present in the polymer to ionic groups.

3. The coating composition according to claim 2, wherein the unsaturated compound is
   a) a conjugated diene with carboxylic acid ionic groups and/or carboxylic acid ion forming groups; or
   b) an unsaturated compound(s) with ion forming groups to obtain a polymer with side groups containing ion-forming groups; or
   c) a conjugated diene with carboxylate forming groups to obtain a polymer with side groups containing carboxylic acid ion-forming groups.

4. The coating composition according to claim 2, wherein the unsaturated polyester is a linear or substantially linear unsaturated polyester.

5. The coating composition according to claim 1, wherein the binder has a weight average molecular weight of at least 5000 g/mole, and/or
   wherein the binder has a weight average molecular weight of at most 40000 g/mole.

6. The coating composition according to claim 1, wherein the acid value of the binder is from 60 to 160 mg KOH/g polymeric binder.

7. The coating composition according to claim 1, wherein the glass transition temperature of the binder is from 10 to 80° C.

8. The coating composition according to claim 1, wherein the polymeric binder is water-dispersible or water-soluble.

9. The coating composition according to claim 1, wherein the side group of the polymeric binder is represented by any one of structures

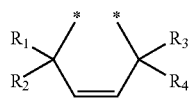

(1)

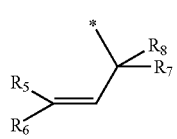

(2)

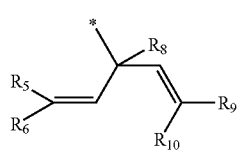

(3)

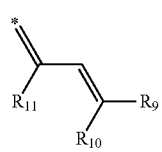

(4)

or any isomer thereof, wherein:
   $R_1$ is selected from the group of anionic groups, which group consists of carboxylate (—COO$^-$), sulphate (—OSO$_3^{31}$ ), phosphate (—OPO$_3^{31}$ ), sulphonate (—SO$_2$O$^{31}$ ), phosphinate (—POO$^-$), phosphonate (—PO$_2$O$^-$) and substituted alkyl, alkenyl, aryl and alkylaryl groups of the formula —R$_{12}$-A$^-$;
   wherein R$_{12}$ is linear or branched alkyl, alkenyl, aryl or alkylaryl moiety, which moiety has 1-12 carbon atoms;
   wherein A$^-$ is an anionic group selected from carboxylate, sulphate, phosphate, sulphonate, phosphinate and phosphonate;
   wherein R$_2$-R$_{11}$ may each be individually chosen from either the group of anionic groups defined for R$_1$ or from the group consisting of hydrogen, alkyl, alkenyl, aryl and alkylaryl;
   wherein * represents a carbon atom of the polyester to which the side group is attached, and;
   wherein for structure (2), at least one of R$_5$, R$_6$, R$_7$ and R$_8$ must be an anionic group;
   wherein for structure (3), at least one of R$_5$, R$_6$, R$_8$ R$_9$ and R$_{10}$ must be an anionic group;
   wherein for structure (4), at least one of R$_9$ R$_{10}$ and R$_{11}$ must be an anionic group.

10. The coating composition according to claim 9, wherein A$^-$ is a carboxylate and/or wherein R$_2$-R$_{11}$ are each be individually chosen from either the group of anionic groups defined for R$_1$ or from the group consisting of H, alkyl and alkenyl.

11. The coating composition according to claim 1, wherein the polymeric binder comprises at least one of the following structural units (5) and (6):

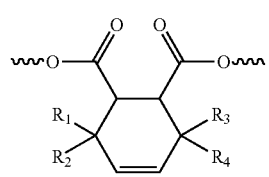

(5)

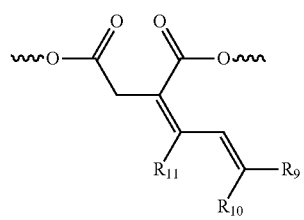

(6)

wherein R$_1$ is COO$^-$, R$_2$ and R$_3$ are H; and R$_4$ is methyl; and
wherein R$_{11}$ is ethyl; R$_9$ is COO$^-$; and R$_{10}$ is H; and/or any isomer thereof.

12. The coating composition according to claim 1, wherein the amount of binder is from 5 to 45 wt. % and the amount of pigment is from 55 to 95 wt. %, based on the dry weight of the aqueous coating composition.

13. The coating composition according to claim 1, wherein the pigment is selected from the group consisting of calcium carbonate, titanium dioxide, a silicate, gypsum, baryte, and combinations thereof.

14. The coating composition according to claim 1, wherein the coating composition further comprises a) an adhesion promotor selected from the group consisting of silanes; and/or
b) a pigment divider; and/or
c) a thickener.

15. The coating composition according to claim 1 having a pH in the range of 8.0-12.0.

16. A method for forming a functional coating on an outside wall and/or roof of a greenhouse, wherein the method comprises (1) applying the coating composition according to claims 1 and (2) drying the coating composition.

17. The coating composition according to claim 1, wherein the coating composition comprises a crosslinker in an amount of less than 1 wt. % based on the total weight of the coating composition.

18. The coating composition according to claim 1, wherein the coating composition comprises no crosslinker.

19. The coating composition according to claim 1, wherein the ionic group is selected from the group consisting of carboxylate ($-COO^-$), sulphate ($-OSO_3^-$), phosphate ($-OPO_3^-$), sulphonate ($-SO_2O^-$), phosphinate ($-POO^-$) and phosphonate ($-PO_2O^-$).

20. A functional coating removable with a removing agent comprising a strong base wherein the strong base is an alkali metal hydroxide, wherein the functional coating comprises a pigment and a polymeric binder, wherein the binder has a weight average molecular weight of from 2000 to 50000 g/mole, and an acid value of 40 to 250 mg KOH/g polymeric binder, wherein the binder is a polyester comprising a side group introduced by a Diels-Alder and/or pericyclic Ene-reaction, wherein the side group contains an ionic group.

21. A surface provided with a functional coating according to claim 20.

22. The surface according to claim 21, wherein the surface is an outside wall and/or roof of a greenhouse.

23. A method for removing a functional coating on an outside wall and/or roof of a greenhouse which coating is a coating according to claim 20, wherein the method comprises treating the functional coating with a removing agent which comprises water, a strong base and optionally a complex former, the strong base being present in an amount of from 1 to 10 wt. %, and the complex former, if present, is present in an amount of from 2 to 10 wt. %, based on the weight of the removing agent, and wherein the strong base is an alkali metal hydroxide.

\* \* \* \* \*